United States Patent [19]
Johnston

[11] Patent Number: 5,301,436
[45] Date of Patent: Apr. 12, 1994

[54] CARTRIDGE RUNOUT FIXTURE

[76] Inventor: Roger B. Johnston, 3372 N. Lucille La., Lafayette, Calif. 94549

[21] Appl. No.: 944,457

[22] Filed: Sep. 14, 1992

[51] Int. Cl.$^5$ ............................................. G01B 1/00
[52] U.S. Cl. ...................................... 33/506; 33/551; 33/555.3; 86/1.1
[58] Field of Search ................ 86/10, 24, 1.1; 33/506; 83/549, 550, 551, 553, 555, 555.3

[56] References Cited

U.S. PATENT DOCUMENTS

| | | | |
|---|---|---|---|
| 1,364,534 | 1/1921 | Walter | 33/506 |
| 3,398,456 | 8/1968 | Cooper | 33/506 |
| 4,285,132 | 8/1981 | Kloster | 33/550 |
| 4,637,144 | 1/1987 | Schemel | 33/550 |
| 4,674,193 | 6/1987 | Wertepny et al. | 33/550 |
| 4,679,330 | 7/1987 | Williams | 33/550 |

FOREIGN PATENT DOCUMENTS 903523 10/1945 France ................... 33/550

OTHER PUBLICATIONS

Creighton Audette, "Overlooked Aspects of the Cartridge Case," Precision Shooting, Dec. 1981, vol. 27, No. 8.
Creighton Audette, "Cartridge Cases and Accuracy," American Rifleman, Jun. 1981, pp. 27-29, 71-72.
Creighton Audette, "High Power Target Rifle Shooting," Precision Shooting, Sep. 1986, vol. 32, No. 5, pp. 4-6, 8-19.
Advertisement for Electronic Wall Thickness Tester, Precision Shooting, Nov. 1987, vol. 33, No. 7, p. 6.
Creighton Audette, Precision Shooting, Feb. 1988, vol. 33, No. 10, pp. 18-23.
Letter from Allen Bench, Precision Shooting, Mar. 1989, vol. 34, No. 11, pp. 24-25.
Letter from Merrill Martin, Precision Shooting, Apr. 1989, vol. 34, No. 12, pp. 8-9.
John J. Gammuto, "BR BRASS, Accuracy Wildcats Case Selection," Precision Shooting, Sep. 1990, vol. 36, No. 5, pp. 26-32.
Letter from Merril Martin, Precision Shooting, Oct. 1990, vol. 36, No. 6, pp. 18-20.
John J. Gammuto, "Spent Cartridges and Identifying Accuracy Problems," Precision Shooting, Nov. 1990, vol. 36, No. 7, pp. 4-13, 29.
Boyd Mace, Precision Shooting, Dec. 1990, vol. 36, No. 8, pp. 27, 39.
Todd A. Kindler, "The Concentricity Gage," Precision Shooting, Jun. 1991, vol. 37, No. 2, pp. 32-35.
"Cathode Ray Tube Test Fixture" by J. F. Kanabroski, IBM Technical Disclosure Bulletin, vol. 2, No. 5, Feb. 1960.

Primary Examiner—Harold J. Tudor
Attorney, Agent, or Firm—Malcolm B. Wittenberg

[57] ABSTRACT

A fixture for measuring runout in firearm cartridges, casings and bullets is provided. The fixture holds the cartridge at the tip and forward of the rim for rotation. A self centering tip bearing holds the tip of the cartridge, casing or bullet for rotation about an axis of rotation. The exterior surface of the cartridge, casing or bullet is supported in a V-shaped knife edge bearing. The distance from the knife edge bearing to the tip bearing is adjustable to accommodate various cartridge sizes. Interchangeable tip bearing tools are provided for rotatably holding bullets and casings, and for locating areas of variation in the thickness of the casing wall. The thickness indicating tool has a flat surface offset from the cartridge axis, which rests against the curved interior surface of a casing, forming a chord which supports the interior surface at two points. The gauge arm, placed on the outside of the casing between the two points, can then measure the relative thickness of the casing wall.

4 Claims, 5 Drawing Sheets

CARTRIDGE RUNOUT FIXTURE

BACKGROUND OF THE INVENTION

The present invention relates to devices for locating eccentricities in cartridge casings, bullets, and cartridges for firearms.

All shooters, whether they are police officers, olympic shooters, or weekend enthusiasts, have one common goal: hitting their target accurately and consistently. Accuracy and consistency in shooting depend largely on the skill of the shooter and the construction of the firearm and ammunition.

The accuracy of a firearm can be enhanced by the use of precisely-made components, including precisely-made ammunition. It is well known in target shooting that using ammunition in which the propellant weight and type, bullet weight and dimensions, and cartridge dimensions are held within very strict limits, and are thus consistent can improve accuracy in shooting. The wider the variation or impreciseness of these individual factors, the greater the loss of accuracy. Such loss of accuracy produces wide variations in bullet trajectory, which in target shooting produces a large pattern or grouping of bullet holes in the target (and a lower score than would be expected if the group were smaller or "tight"). The variations in the physical components of the ammunition should therefore be considered in order to obtain optimum accuracy.

As a practical matter, commercially available ammunition or ammunition components, like casings, bullets, primers, and propellant, are all made within certain tolerances set by their manufacturers. Therefore, while these components may be within the manufacturing tolerance, some of the components may be near the optimal specification while others may be very close to the outside tolerance.

For example, cartridge casings are optimally cylindrical in shape. Thus, if one imagines a longitudinal axis passing through the center of casing from the head of the casing extending out of the mouth of the casing, a cross-section of the casing taken anywhere along the axis, perpendicularly to the axis, would reveal that the axis is in the center of a circle, if the casing is optimally shaped. That is, the wall of the casing is "concentric." However, perfect concentricity is rare; casings, bullets, and cartridges may exhibit one or more eccentricities. Thus, casings may be produced which have a "thin" side or a "thick" side, or bullets may be produced which deviate from a perfectly circular cross section to produce a "high" area where two halves of a mold joined. Such variations from the optimum are called "eccentricities." As pointed out by Creighton Audette in "Overlooked Aspects of the Cartridge Case," *Precision Shooting*, December 1981, Vol. 27, No. 8, one must consider the eccentricities if accuracy in shooting is to be attained.

"Runout" is a term which is often used to describe eccentricities which affect the outer (external) surface of a cartridge casing, bullet, or other generally cylindrical object. Runout is a deviation from the midline axis (also known as the central longitudinal axis or the geometric axis) of the outside surface of a cylinder. For example, cartridge casing "runout" can involve a "banana shape" curve in which the casing is not a perfectly straight cylinder, but bends longitudinally. With this kind of runout, each cross section may be perfectly circular, but eccentric or offset relative to the geometrical axis of the cartridge as a whole. "Banana shape" runout is typically seen only in fired cartridge casings (which are commonly cleaned, resized and reloaded), and typically becomes more pronounced with every firing.

"Egg-shape," or out-of-round runout occurs when one transverse cross section of a casing, bullet or cartridge is not circular. This eccentricity is typically local, and may occur at any one cross section independently of its occurrence at any other cross section. Having found egg shape at one point, one cannot predict what various degrees, shapes or orientations of deformity might be found elsewhere.

Head runout occurs when the head on a casing is not "square." This condition occurs when the head of the casing (or more commonly, a portion of the head of the casing) is not perpendicular to the central longitudinal axis of the casing.

Yet another troublesome eccentricity occurs when the casing wall thickness is not uniform. When this occurs, a portion of the casing wall is thinner. Because the outer surface of the casing may be uniform, checking for runout will not reliably determine variations in casing wall thickness. If the casing is thinner in a certain area, that section of the wall may unevenly stretch upon firing in both width and length, and the whole casing may, after several uses, be distorted into a banana-like shape.

All of these eccentricities effect accuracy in shooting. With runout, the bullet can be misaligned off axis in the bore when the cartridge is chambered in the firearm. If the casing thickness varies, for example in the neck region where the bullet is lodged, the bullet can be laterally offset and again may be positioned in the bore off axis from the optimum position when chambered. As noted above, very small errors will spread the bullet trajectories. For accurate shooting, the casing, bullet and loaded cartridge should be true within 0.001 inch or less.

In a cartridge having a bullet and casing which may each have one or more different eccentricities, random orientation of the eccentricities will cause a loss of accuracy (larger group size) when shooting at a target. A cartridge with one or more randomly oriented eccentricities can have unpredictable ballistics. Cartridge runout (out-of-roundness, bending, or lack of symmetry about the central axis of the cartridge) in either the bullet or the casing will spread the bullet trajectories if the departure from truly cylindrical shape is as little as a thousandth of an inch. If one could determine the location of the eccentricities, it would be possible to orient the eccentricities and mark or "index" the loaded cartridge. As explained by Creighton Audette, indexing allows the shooter to consistently align the eccentricities in a loaded cartridge in the chamber of a firearm, thus offsetting any inaccuracy due to the eccentricities. As noted above, eccentricities as small as 0.001 inch can effect accuracy. Such small errors are not detectable with the naked eye, and are difficult to detect with ordinary equipment.

Thus, the need exists for a fixture which can reliably check cartridge casings, bullets, and loaded cartridges for runout and check cartridge casings for variations in wall thickness. Such a fixture should be accurate, easy to use, inexpensive and rugged.

SUMMARY OF THE INVENTION

The present invention provides a fixture for detecting runout of a cartridge casing, bullet or loaded cartridge, as well as relative variation in casing wall thickness. The fixture includes a base on which is mounted a cartridge tip bearing, such as bullet seating stem, to accept and hold for rotation the tip of a bullet or the neck of a casing. The rear portion of the cartridge casing, bullet, or loaded cartridge rests on a V-shaped knife edge bearing surface. Thus, the rear portion of the casing, bullet or cartridge rests on only two points of contact and can be freely rotated while held in a stable orientation.

The knife edge bearing surface is mounted for movement parallel to the longitudinal axis of a cartridge casing, bullet or loaded cartridge mounted for measurement. Sliding the knife edge adjusts the distance from the knife edge to the tip bearing, to accommodate cartridges, bullets and casings of various lengths. Once an appropriate length is selected, the knife edge can be locked in position.

To measure runout of the cartridge a commercial dial indicator gauge is used. The dial gauge has an arm which is spring-loaded to bear against the outside surface of the cartridge. Motion of the arm is registered on the dial. The gauge can be adjustably mounted adjacent to the fixture base for positioning the arm against a desired location on the casing, bullet or loaded cartridge supported at one end by the tip bearing and at the other end by the knife edge bearing surface.

To locate variations in the thickness of cartridge casings, a special tool having rod at the end of which is fixed two aligned, spaced apart points which are positioned substantially perpendicular to the axis of rotation of the casing is used to support the rear portion of the cartridge casing. This "chord anvil" is inserted longitudinally through an opening in the bearing tip to enable the chord anvil to be extended into a cartridge casing mounted on the bearing tip, and moved towards and away from the casing head as desired. The chord anvil preferably includes an offset straight edge formed transversely to the longitudinal axis of the rod, with the two aligned, spaced apart points being the ends of the straight edge. Thus, when the straight edge of the chord anvil contacts the inner surface of the casing, it forms a chord across the transverse cross-sectional circle and thus supports the inner surface of the casing on two bearing points. The two bearing points provide a stable base, so that when the casing is rotated over the chord anvil, with the indicator gauge arm resting on the outside of the cartridge casing between the two bearing points, an area of thinner wall which passes over the chord anvil will cause relative movement downward of the outer case wall which will be detected by the indicator gauge.

BRIEF DESCRIPTION OF THE DRAWINGS

A better understanding of the invention and its advantages will be apparent from the detailed description taken in conjunction with the accompanying drawings in which.

DETAILED DESCRIPTION OF THE BEST MODE OF THE INVENTION

Figure 1:
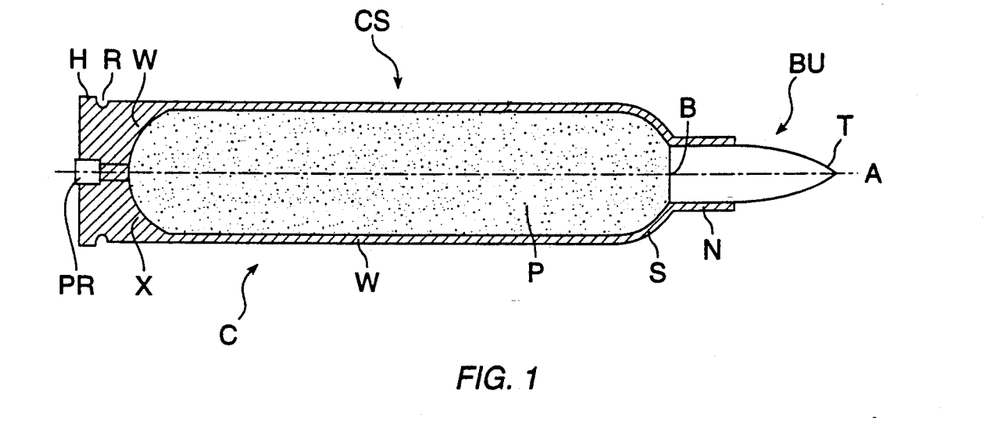
FIG. 1 is an illustrative cut away view showing the various parts of a loaded cartridge.

As shown in FIG. 1, a loaded cartridge C includes a cartridge casing CS having a head H, a rim R, a web X, a wall W, a shoulder S, and a neck N. The bullet BU includes a tip T and a base B which is seated in the neck N of the casing CS. The interior cavity of the casing is filled with propellant P, and a primer PR is inserted through an opening in the head H which extends into the interior cavity of the casing. The geometrical axis of the generally cylindrical cartridge is shown by a dotted line identified as A.

FIGS. 2-6 illustrate a fixture of the present invention, along with its component parts. The fixture preferably includes a base 10, a tip bearing (200, 210), a support block 30 which includes an inclined "V" shaped groove in the top surface which forms a "V" shaped knife edge bearing surface 34 at one end. Rods 40 attached to base 10 to provide a block slide mechanism for moving the support block 30 towards and away from the tip bearing (200, 210). A "chord anvil" 220 can be used with the fixture to determine relative variance in wall thickness, as described in detail below. A means for detecting eccentricities is also provided, such as dial indicator gauge 50.

Base 10 can be constructed from any suitable material which will provide fixture stability, such as, for example, hard anodized, heat treated aluminum alloy. Base 10 can be provided with a chamber 12 for receiving interchangeable tip bearings 200, 210, and a means for locking a selected tip bearing in the chamber 12 to prevent movement of the tip bearing relative to the base 10, such as thumb screw 13. Other openings 14, 16 can be provided in base 10 for holding accessories such as extra tip bearings. These openings 14, 16 can be provided with locking means, such as thumb screws 15, 17 for securing the accessories in the base until their use is desired.

Base 10 also preferably includes parallel rods 40 extending substantially perpendicularly from the front surface 8 of the base 10, and parallel to the bore of chamber 12. Rods 40 are preferably attached to base 10 beneath and to either side of chamber 12, and pass through openings 31, 31' in support block 30. Thus, support block 30 can be moved slidably from the distal ends of rods 40 to the front surface of base 10, while maintaining its alignment relative to the front surface 8 of the base 10. Rods 40 can be constructed from any suitable material which is compatible with base 10 and block 30 such as, for example, stainless steel. Rods 40 can be fixed into the base 10 either permanently or removably by any conventional means.

Block 30 also provides stability to the fixture, and includes a knife edge bearing surface 34 which self-centers the case, bullet or cartridge for detecting runout. Block 30 can be made of hard, anodized aluminum or other suitable material, and preferably includes a means for locking the block 30 in a desired position on rods 40, such as the thumb screw shown in FIG. 6. In the preferred embodiment, bearing surface 34 is formed, for example, by machining an inclined "V" shaped groove in the top surface 32 of the block 30. This forms a "V" shaped knife edge bearing surface 34 which will be symmetrically disposed about the general center line, or axis, of a casing, bullet or cartridge C placed in the "V". The knife edge bearing surface 34, and the general inclination of the groove is shown in more detail in FIG. 3. The distance identified in FIG. 3 as H is smaller than the distance identified as h; that is, the "V" groove in the figure inclines downwardly as it extends towards the viewer. The knife edge bearing surface 34 of the groove functions as a minimum contact, stabilizing bearing surface, which self-centers a casing CS, bullet BU or cartridge C for rotation about its longitudinal axis. If desired, the bottom surface 33 of support block 30 may also be provided with a knife edge bearing surface of different dimensions to accommodate casings or bullets which are larger or smaller than those accommodated by knife edge bearing surface 34, thus permitting the user to check a wider variety of cartridge, bullet and casing sizes by simply removing, reversing and replacing the block 30 on the rods 40. Additionally, one may also wish to provide a means for raising or lowering the knife edge bearing surface 34 relative to the tip bearing means 200, 210 to enable the user to more closely align the axis of rotation of a casing, cartridge or bullet with its geometric axis.

Figure 4A:
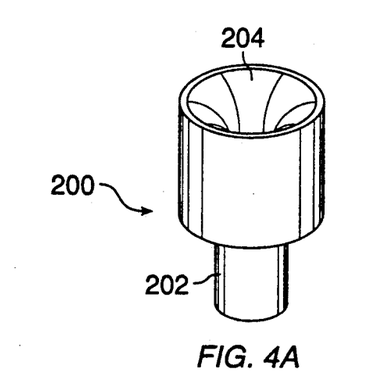
FIGS. 4a-4c are perspective views of preferred tip bearings for rotatably holding bullet tips and casing necks.
Figure 4B:
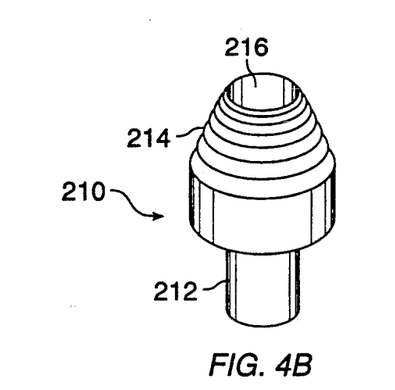

As shown in FIGS. 4a and 4b tip bearings 200, 210 include a shank portion 202, 212 and a tip portion 204, and cylindrical center bore 216. Various tip bearings may be used interchangeably. Among the preferred bearings is a bullet holder 200 having a horn shaped, smoothly rounded internal bore shaped to center the tip T of bullets of various sizes and shapes. The inner surface of the horn shaped internal bore is preferably not conical, but rather resembles a hyperboloid of revolution or the part of a toroid near the central hole.

Figure 4C:
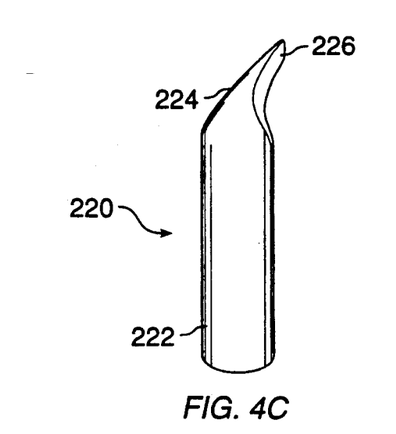

Another preferred tip bearing is casing holding 210 which has a tip portion with stepped cones with staggered cylindrical sections (having diameters to fit inside variously-sized common cartridge casing necks), commonly referred to as a step cone tip bearing. The tip 214 of casing holder 210 includes a series of coaxial cylinders distal the shank 212, with diameters selected to internally fit a series of cartridge necks in a preferred series of diameters. The tip of the casing holder 210 can also be provided with a cylindrical center bore 216 adapted to slidably accept and hold a tool rod of smaller diameter than shank 212. A hole (not shown) can also be provided through the shank 212 to permit the tool rod to be locked along with the shank 212 by thumb screw 13. By providing a cylindrical center bore 216, the casing holder 210 can accept the "chord anvil" tool 220, as shown in FIG. 4c, which is used to determine wall thickness eccentricity as will be described in more detail below.

As noted above, the shank end 202, 212 of the bearing tip 200, 210 slides into chamber 12 from the front surface 8 of base 10, so that the tip portion extends towards block 30 to receive a bullet tip or casing neck. The shank is locked in place, for example by thumbscrew 13 threaded through the body of the base 10 to pin the shank within the bore of the chamber 12, and most preferably to prevent movement of the bearing tip relative to base 10.

Other tip bearing tools (not shown) may be improvised as needed or desired. Such tools may fit into the chamber 12. For example, a ball bearing may be attached to the tip of a rod or tube of the same diameter as the shank rods 202, 212, on which the casing neck N or a hollow-point bullet (not shown) might rotate. A commercial bullet seating stem may also be suitable for holding the bullet BU tip. Such stems may be removed from a reloading die or purchased.

For measuring or detecting eccentricities, a means for mounting and orienting a measuring gauge adjacent the bullet, casing or cartridge is preferably provided, such as rod 60 and clamp 48. Rod 60 can be constructed from any suitable material, such as, for example, stainless steel rod. Rod 60 is attached, either permanently or removably, to base 10 so that rod 60 is substantially parallel to rods 40. A clamp 48 which is slidable along the rod 60 and which has a suitable means for attachment can be used to attach a measuring gauge to the rod 60. Preferably, clamp 48 has a locking means which enables it to be locked in position on rod 60. This arrangement enables the measuring gauge to be moved to a desired location to measure runout either parallel or perpendicular to the longitudinal axis of the bullet, casing or cartridge being checked.

The measuring device or gauge 50 is preferably a commercially available dial indicator gauge with a swivel arm holder, for example, the Starrett brand "Last Word" dial indicator gauge or the Gem model 222 indicator gauge. Gauge 50 includes an arm 52, at the distal end of which is a ball 56. The ball 56 bears against the external surface being measured. The arm 52 is spring-loaded so that the ball 56 continues to bear on the surface as it is rotated, in spite of eccentricities of the surface caused by runout or variations in wall thickness. The arm 52 is internally coupled to the indicating dial 54. The user can see by the movements of the dial 54 hand when the arm 52 moves to indicate runout. Dial readings can be taken at different points along the bullet, casing or cartridge body to measure the amount of runout at any given point. The gauge 50 indicates runout if the hand on the indicator dial 54 moves.

Gauge 50 is preferably adjustably mounted on rod 60, allowing the gauge to be moved along rod 60 to a desired position, and then locked in position. This allows the ball 56 at the tip of the arm 52 to be placed into contact with the surface of a bullet, casing or cartridge of differing sizes and shapes, at any desired longitudinal position between the tip bearing 200, 210 and the knife edge bearing surface 34. When the bullet, casing or cartridge is rotated, the gauge 50 will measure the runout parallel to the axis of rotation at that position. With a reorientation of the fixture, explained in detail below, gauge 50 can also be placed above the head of the cartridge or casing and the ball tip 56 of the arm placed in contact with the outer surface of the head H, to measure runout of the head perpendicular to the axis of rotation.

Gauge 50 preferably reads values in standard units of length, but may be of a type which only indicates change in distance, not absolute measurements. While a dial gauge is preferred since it is readily available, economical, and easy to use, other types of gauges may also be used with the fixture to measure runout, including non-contact gauges, and such gauges may include a variety of indicator means, including, for example, mechanical dials or digital displays.

A fixture of the present invention can be used to measure runout on a loaded cartridge or a bullet, runout on a cartridge casing, runout (squareness) on a casing head, and variations in wall thickness, as explained in detail below.

Runout in a bullet, casing or cartridge can be detected by rotating the bullet, casing or cartridge about a longitudinal axis of rotation while holding a stationary measuring gauge against the external surface of the bullet, casing or cartridge, such as a dial indicator micrometer with a spring-loaded arm (as shown in FIGS. 2 and 5-7). Because the gauge is locked in position, the point where the gauge tip 56 touches the surface stays at one longitudinal position. If there is runout, then as the bullet, casing or cartridge is turned, the radial distance from the axis of rotation to the surface will vary, the gauge arm will move up or down, and the runout will be measured. The runout that is measured is thus a relative value which measures the variations on the external surface of the cartridge, bullet or casing. Therefore, to measure runout, a longitudinal axis of rotation of the cartridge, bullet or casing must be located and the cartridge, bullet or casing rotated about that axis. It is preferred that the axis of rotation substantially coincide with the geometrical axis of the cartridge, bullet or casing.

The measurement of runout using a fixture of the present invention is far simpler than heretofor possible, because the arrangement of elements of the fixture insure that the bullet, casing or cartridge is properly mounted for rotation around a longitudinal axis of rotation and for the subsequent measurement of eccentricities during rotation.

Figure 2:
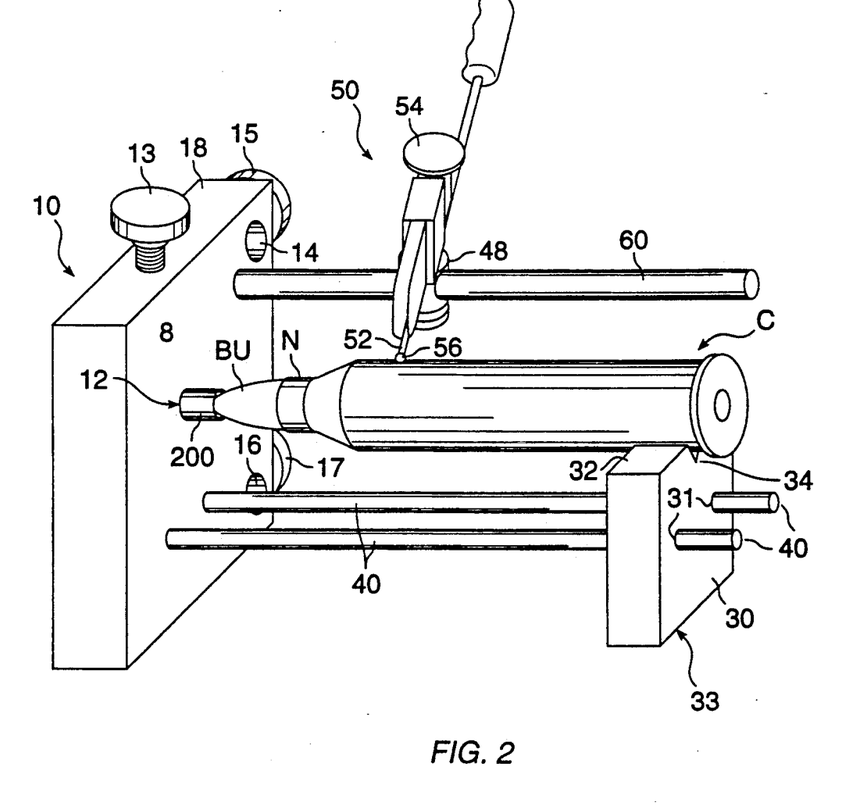
FIG. 2 is a perspective view of a fixture of the present invention in which the components are aligned to detect runout along the length of a cartridge or bullet.
Figure 3:
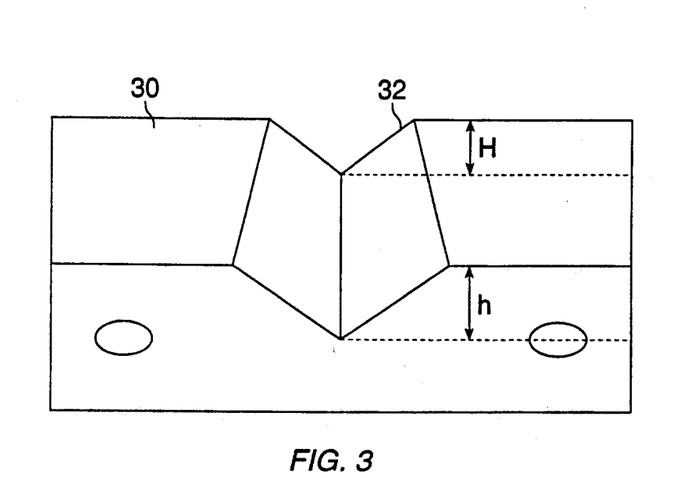
FIG. 3 is a perspective, elevated back view of a support block showing the inclined "V" slot which forms a knife edge at one side of the block.

FIG. 2 illustrates a fixture of the present invention used for measuring runout in a cartridge or a bullet. In FIG. 2, as well as FIG. 5, the fixture is shown in one of its normal positions of use, with the top surface 18 of base 10 and the top surface 32 of block 30 facing up. In this position the cartridge casing wall is held against the knife edge bearing surface 34 by the weight of the cartridge C. Cartridge C is rotatably held in a generally horizontal position by placing the tip of the bullet B in the bearing 200 and the casing (forward of the rim) on the knife edge bearing surface 34. Block 30 may be slidably moved along rods 40 to position the knife edge bearing surface 34 to receive the casing body, preferably at a location slightly forward of the web W, rim R and head H. This is a preferred location for support on the knife edge bearing surface 34 because the casing measurement will not be influenced by web-rim-head eccentricities. Assuming that the casing was true, with a circular cross-section when made, the external surface of the casing is most likely to remain concentric or true just forward of the web W. It should be noted that the web, rim and head are preferably not placed in contact with the knife edge bearing surface 34, since the external surfaces of these regions are often not concentric. An intermediate position, well forward of the web, may also be selected as a point of support for bearing the casing against the knife edge bearing surface.

Runout can be measured at any desired point along the body of the cartridge between the bearing 200 and the knife edge bearing surface 34 by placing the gauge arm 52 such that the gauge tip 56 bears against the cartridge body at the desired point and the cartridge is rotated, for example with the fingers. As the cartridge C is turned, the movable arm 52 of the gauge 50, resting against the surface of the cartridge, will move if there is runout. The runout amount will be seen on the indicating dial 54. The cartridge can be checked for runout at several locations along its length, parallel to the axis of rotation. A bullet can also be measured for runout using this embodiment. If runout is detected, the location of the runout can be marked, if desired, for indexing, and the amount of runout can be used to assess whether the cartridge should be used for high-accuracy activities such as competitive shooting, or for lower accuracy activities like plinking.

Figure 5:
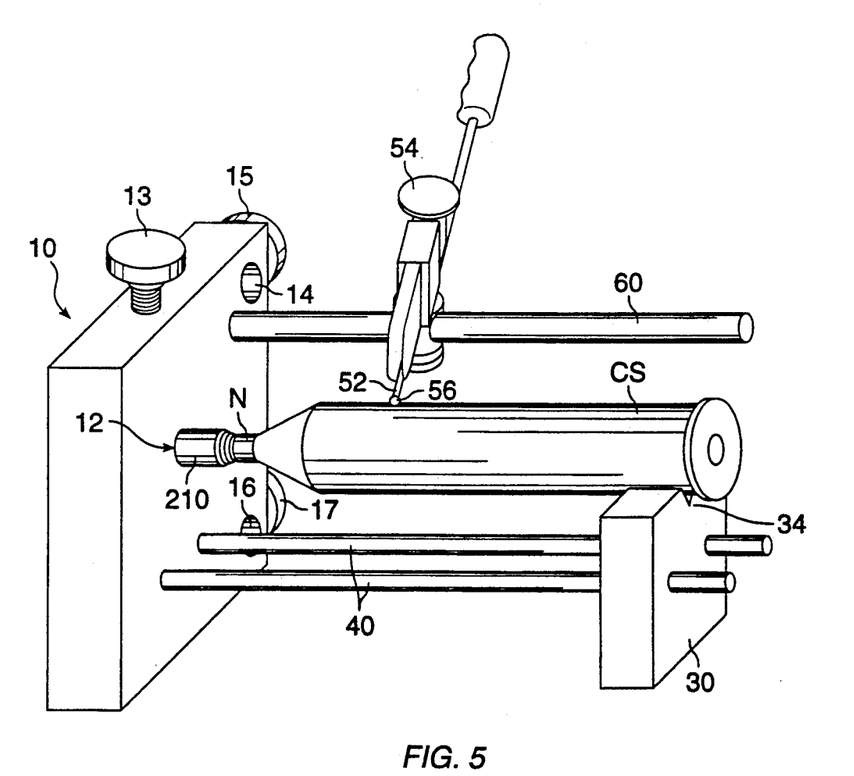
FIG. 5 is a perspective view of a fixture of the present invention in which the components are aligned to detect casing runout.

In FIG. 5, a cartridge casing CS is mounted for the measurement of runout. The casing CS is rotatably held in a generally horizontal position by placing the neck N of the casing over the step cones 216 of tip bearing 210 until the neck N of the casing is snugly supported by one of the concentric step cone cylinders. The body of the casing (forward of the web) is placed on the knife edge bearing surface 34, as described above. Runout can be measured at any desired point along the body of the casing CS between the tip bearing 216 and the knife edge bearing surface 34 when the gauge tip 56 bears against the casing body at the selected point and the case is rotated, for example with the fingers. As described above, the movable arm 52 of the gauge 50, resting against the surface of the case CS, will move if there is runout, and the movement will register on the indicating dial 54.

Figure 6:
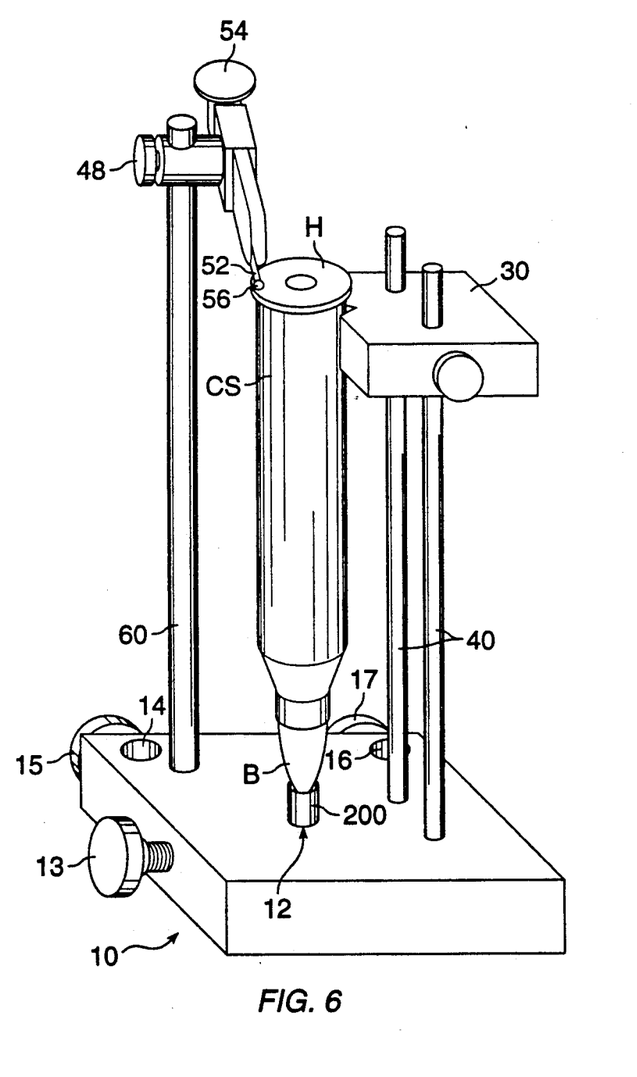
FIG. 6 is a perspective view of a fixture of the present invention in which the components are oriented to detect head runout; and, FIG. 7 is a partial, transverse cross sectional view of a fixture of the present invention in which the components are aligned to locate variations in the thickness of a casing wall.

As shown in FIG. 6, a fixture of the present invention can also be used to measure head "squareness." This kind of runout occurs when the back surface of the case head is not uniformly perpendicular (or "square") to the geometrical axis of the casing. To measure head squareness, the base is rotated, so that the front surface 8 of the base 10 is uppermost (and the back surface rests on a flat surface), and the tip bearing 210 is oriented to receive a casing CS in a substantially vertical position. A casing CS is fitted on the tip bearing 210. The support block 30 is unlocked and moved on rods 40 to position the knife edge bearing surface 34 at a desired location between the neck N and the web W on the casing CS, preferably close to web W. The clamp 48 is unlocked and slidably moved along rod 60 until the indicator gauge 50 is positioned slightly above the casing head H, where it is locked in position on rod 60 to measure runout perpendicularly to the axis of rotation. Gauge arm 52 is moved such that the gauge tip 56 bears down against the head H at the desired location. The casing CS is then held against the knife edge bearing surface 34 and the casing is rotated, for example with the fingers. As the casing CS is turned, the movable arm 52 of the gauge 50, bearing against the head H of the casing, will move if there is runout (i.e., if the head is not square). A loaded cartridge C may also be checked for head runout in this way, by merely substituting tip bearing 200 for tip bearing 210. If runout is located, the cartridge may be marked for indexing, if desired.

Figure 7:
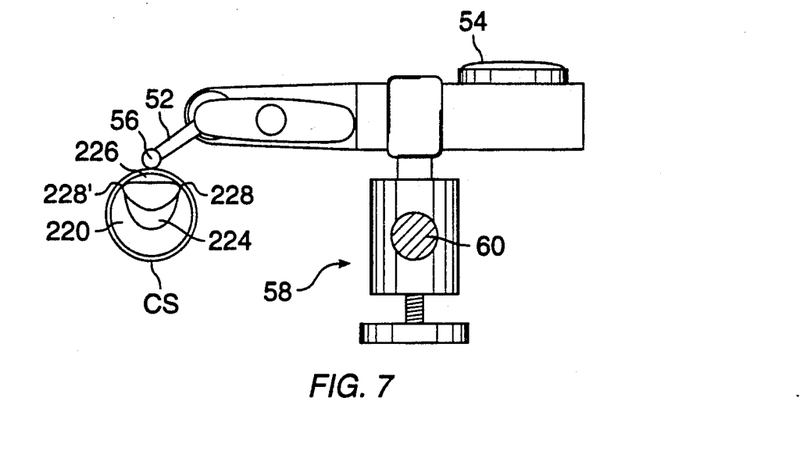
Figure 8:
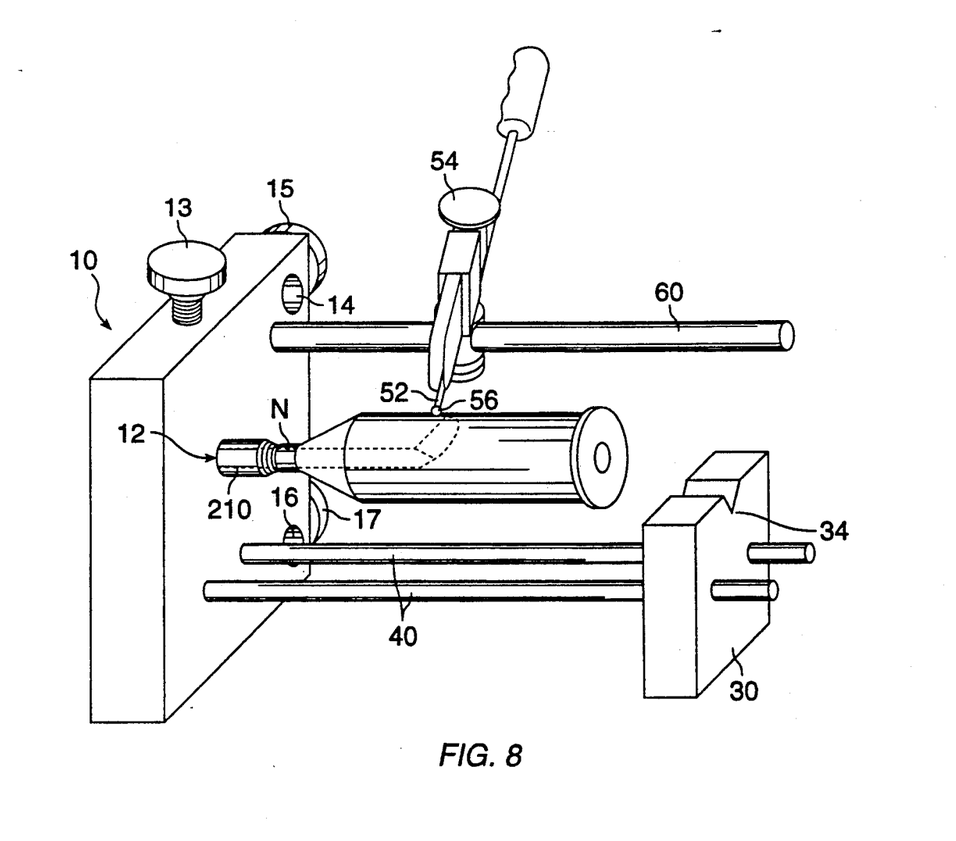
FIG. 8 is a perspective view of a fixture of the present invention in which the components are aligned to locate variations in the thickness of a casing wall.

As shown in FIGS. 7 and 8, a fixture of the present invention, when used in combination with a chord anvil tool 220, can be used to check for variations in casing wall thickness. For this determination, the fixture is returned to its first "normal" position, as shown in FIGS. 2 and 5, with the top surfaces 18, 32 facing up and the bearing tip 210 oriented to hold a cartridge casing in a generally horizontal position. As noted above, step cone bearing tip 210 can be provided with a central longitudinal bore through its shank 212 to slidably receive a rod, such as rod 222 of chord anvil tool 220. The chord anvil rod 222 can thus be inserted through the central bore of the step cone bearing tip, and extend through the base 10, to enable the chord anvil tip 226 to be slidably moved by manipulating the rod extending behind the base 10 to any desired location inside the casing CS beyond the bearing tip 212 and before the rim R. This positioning of the chord anvil tool 220 is shown in broken line fashion in FIG. 8. Once a location has been selected, a means for locking the chord anvil rod 222 in place is preferably provided. This can include, for example, a hole through the shank 212 which allows the thumb screw 13, or any other suitable fastener, to bear against rod 222.

In use, the chord anvil tip 226 is unlocked and manipulated by means of the rod 222 towards the bearing tip 210 to enable a cartridge casing to be fitted over the bearing tip 210. The chord anvil tip 226 can then be moved into the interior of the cartridge until it contacts the web W, at which point it can be withdrawn slightly and locked at a desired position supporting the interior surface of the cartridge case at two aligned, spaced apart points 228, 228' which are placed so as to be substantially perpendicular to the axis of rotation of the casing CS. These two points 228, 228' are preferably provided as the ends of an offset straight edge bearing surface at the tip 226 of the chord anvil 220. The casing is then removed from the chord anvil tool 220, and the gauge tip 56 is located and locked in place between the two points 228, 228' of support. The casing is then replaced with the neck N on the bearing tip 210 and the interior wall resting on the two points 228, 228', and the gauge tip 56 is moved into contact with the exterior surface of the casing CS. Because the casing CS is supported by its interior surface bearing upon the two points 228, 228' on the chord anvil 220, the casing is stable and will not rock. Thus, no additional stabilizing members are required.

To measure relative variation in wall thickness, one merely rotates the casing about the tip bearing 210 and over the two points 228, 228' on the chord anvil 220; if a thinner portion of casing wall passes between the chord anvil 220 and the gauge tip 56, a relative drop will be sensed by the gauge tip 56 which will register on the dial 54; if a thicker portion of casing wall passes between the chord anvil 220 and the gauge tip 56, a relative rise will be sensed by the gauge tip 56 which will register on the dial 54. Thus, the measurements which are made are not the true thickness of the wall, but rather the distance the arm 52 is deflected. Because of the configuration of the combination of the anvil tip 226, the ball 56 and the casing CS, consistent comparisons are made. This distance is proportional to the thickness of the wall of the casing CS. Once the location of a thicker or thinner part is determined, the casing can be marked for indexing if desired.

The dimensions of the fixture may be chosen to allow any common cartridge, casing, bullet, or other cylindrically symmetrical objects to be held by a bearing tip such as 200, 210 and a knife edge bearing surface 34, for determination of runout. The dimensions of the base 10 and the block 30 are preferably selected for stability and durability, so that when the fixture is resting upon a flat table surface, the block 30 and base 10 both have respective lower surfaces lying flat on the table surface, and the rods 40 are parallel to the table surface.

While the preferred embodiments have been described in detail, and shown in the accompanying drawings, one skilled in the art will recognize that various further modifications are possible without departing from the scope of the invention as set forth in the appended claims.

I claim:

1. A fixture for indicating runout on a cylindrical ammunition component, the cylindrical ammunition component having a first end, an exterior surface including a second end, and a geometrical axis of concentricity, the fixture comprising:

a base;

a tip bearing coupled to the base for supporting said first end of the cylindrical ammunition component so as to permit rotation of said first end about the geometrical axis;

a support bearing coupled to the base for rotatably supporting an exterior surface of the cylindrical ammunition component between said first end and said second end of said cylindrical ammunition component, whereby said cylindrical ammunition component can be rotated relative to said support bearing; and a single runout indicator means operable for detecting runout on said exterior surface, said single runout indicator means including a single tip which bears against the external surface of the cylindrical ammunition component;

whereby runout is measured when said first end of said cylindrical ammunition component is supported by said tip bearing, a portion of exterior surface of said cylindrical ammunition component between said first end and said second end is supported by said support bearing, said tip of said single runout indicator means bears against the external surface of the cylindrical ammunition component, and said cylindrical ammunition component is rotated about a geometrical axis and wherein the tip bearing comprises a stepped cone having concentric cylindrical sections selectively insertable within an opening in said first end of said cylindrical ammunition component.

2. A fixture for indicating runout on a cylindrical ammunition component, the cylindrical ammunition component having a first end, and exterior surface including a second end, and a geometrical axis of concentricity, the fixture comprising:

a base;

a tip bearing coupled to the base for supporting said first end of the cylindrical ammunition component so as to permit rotation of said first end about the geometrical axis;

a support bearing coupled to the base for rotatably supporting an exterior surface of the cylindrical ammunition component between said first end and said second end of said cylindrical ammunition component, whereby said cylindrical ammunition component can be rotated relative to said support bearing; and a single runout indicator means operable for detecting runout on said exterior surface, said single runout indicator means including a single tip which bears against the external surface of the cylindrical ammunition component;

whereby runout is measured when said first end of said cylindrical ammunition component is supported by said tip bearing, a portion of exterior surface of said cylindrical ammunition component between said first end and said second end is supported by said support bearing, said tip of said single runout indicator means bears against the external surface of the cylindrical ammunition component, and said cylindrical ammunition component is rotated about a geometrical axis and wherein the tip bearing includes a smooth, self-centering recess having a generally horn-shaped inner surface described by the revolution of a curved line about the rotational axis.

3. A fixture for indicating runout of cylindrical ammunition components, each ammunition component having first end, an exterior surface including a second end, and an axis of rotation, the fixture comprising:

a base;

a tip bearing mounted on the base for supporting said first end of said ammunition component for rotation;

a support bearing coupled to the base for rotatably supporting on two spaced apart points said exterior surface of the ammunition component at a position between said first end and said second end of said ammunition component; and a single indicator gauge mounted to the base for measuring runout along said external surface of the ammunition component, said single indicator gauge including a single tip which bears against said external surface;

wherein the tip bearing comprises a stepped cone having concentric cylindrical sections selectively insertable within an opening in said first end of said ammunition component;

whereby runout is determined by the indicator gauge for each ammunition component that is located by the tip bearing and the support bearing and rotated about the rotation axis while said tip of said indicator gauge bears against said external surface.

4. A fixture for indicating runout of cylindrical ammunition components, each ammunition component having first end, an exterior surface including a second end, and an axis of rotation, the fixture comprising:

a base;

a tip bearing mounted on the base for supporting said first end of said ammunition component for rotation;

a support bearing coupled to the base for rotatably supporting on two spaced apart points said exterior surface of the ammunition component at a position between said first end and said second end of said ammunition component; and a single indicator gauge mounted to the base for measuring runout along said external surface of the ammunition component, said single indicator gauge including a single tip which bears against said external surface;

wherein the tip bearing includes a self-centering bullet holder having a smooth, generally horn-shaped recess described by the revolution of a curved line about the rotation for accepting a bullet tip;

whereby runout is determined by the indicator gauge for each ammunition component that is located by the tip bearing and the support bearing and rotated about the rotation axis while said tip of said indicator gauge bears against said external surface.

* * * * *